Nov. 21, 1961   R. A. DEGEN ET AL   3,009,384
HOLLOW RIVET FOR HONEYCOMB SANDWICH PANEL
Filed April 30, 1957   2 Sheets-Sheet 2

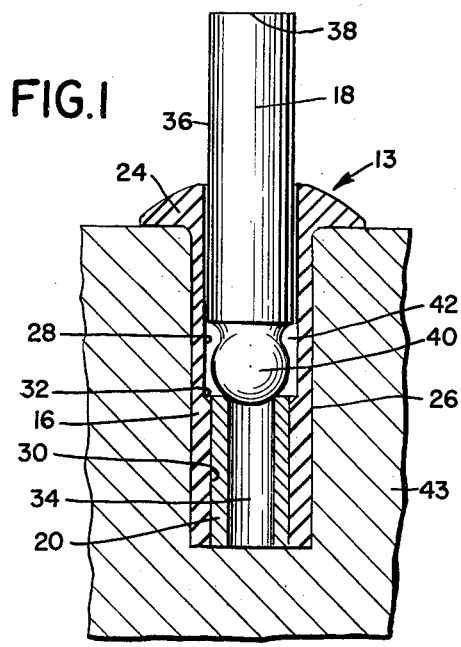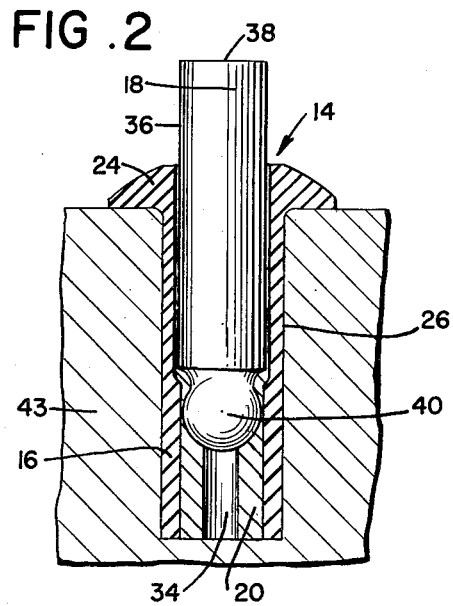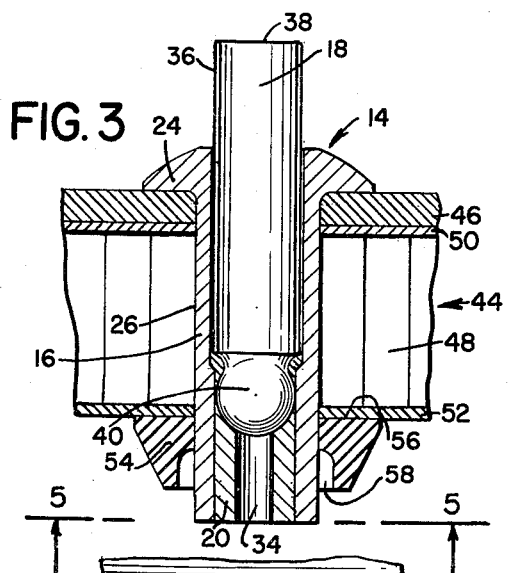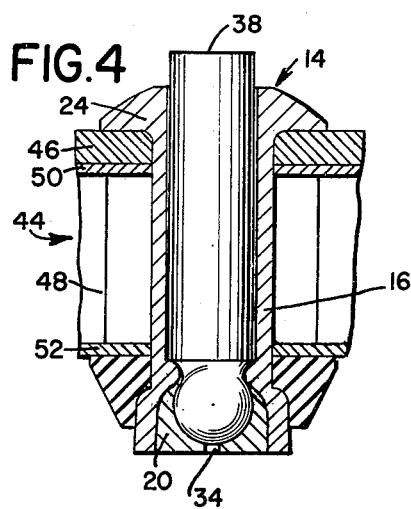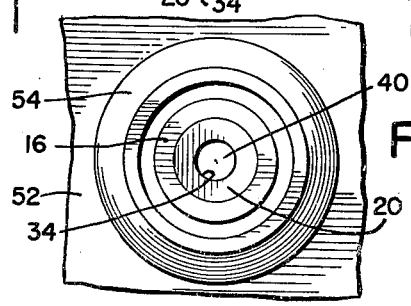

INVENTORS
ROBERT A. DEGEN
KEITH R. BRONSON

ATTORNEY

United States Patent Office 3,009,384
Patented Nov. 21, 1961

3,009,384
HOLLOW RIVET FOR HONEYCOMB SANDWICH PANEL
Robert A. Degen and Keith R. Bronson, Plainfield, N.J., assignors to Elastic Stop Nut Corporation of America, Union, N.J., a corporation of New Jersey
Filed Apr. 30, 1957, Ser. No. 656,001
1 Claim. (Cl. 85—40)

This invention relates generally to fastening devices and more particularly to a rivet having special utility for fastening two structural elements together where one of the elements is such that it may be easily deformed or crushed by compressive forces.

The invention also relates to an improved method of making a rivet.

An example of such a deformable or crushable element is the so-called honeycomb sandwich panel which has found wide application, particularly in aircraft construction, because of its light weight.

Many honeycomb fasteners have been proposed, but most have been subject to the difficulty that they can not accommodate themselves to variation in built-up material thickness, even within established tolerance limits. The result has been that the use of such prior fasteners has resulted in unacceptable deformation of the honeycomb if the thickness referred to is on the high side or a loose connection if the thickness is on the low side.

A rivet embodying this invention solves the problem outlined above in a manner which is both simple and sure.

It is therefore an important object of this invention to provide a honeycomb fastener which will result in acceptable connections regardless of the thickness of the honeycomb, within tolerance limits thereof.

It is another object to provide such a fastener in the form of a rivet.

It is a further object to provide an improved method of making a rivet.

A rivet embodying this invention comprises a tubular body defining an axis and having a head at one end, an expansion member within the body aand spaced a predetermined distance from the head, and a ram having an actuating end within the body and facing away from the head and interengaging the expansion member, and a portion extending outwardly of the body beyond the head, the expansion member being deformable by the actuating end of the ram, in turn to deform the body outwardly from the axis. A collar having a recessed end may also be provided, the collar adapted to be placed on the tubular body from the end thereof remote from the head, with the recessed end facing away from the head. In that case the tubular body after the deformation thereof referred to, conforms to the recess of the recessed end of the collar.

The above and other objects and advantages will become apparent from the following description of two examples of the invention and the accompanying drawings thereof in which:

FIG. 1 is an elevational view, partly in section of a first form of rivet embodying the invention, at an intermediate stage of its manufacture, together with apparatus useful in completing the manufacture;

FIG. 2 is a view similar to FIG. 1 but after the manufacture has been completed;

FIG. 3 is an elevational view, partly in section, of the rivet of FIG. 2 and further including a collar, the rivet being shown ready to be set to fasten together a honeycomb sandwich panel and another structural element;

FIG. 4 is a view similar to FIG. 3, but after the rivet has been set;

FIG. 5 is a view on line 5—5 of FIG. 3; and

Figure 6:
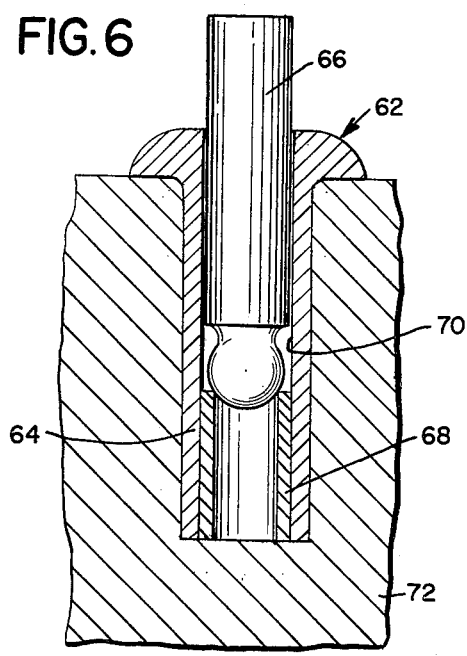
Figure 7:
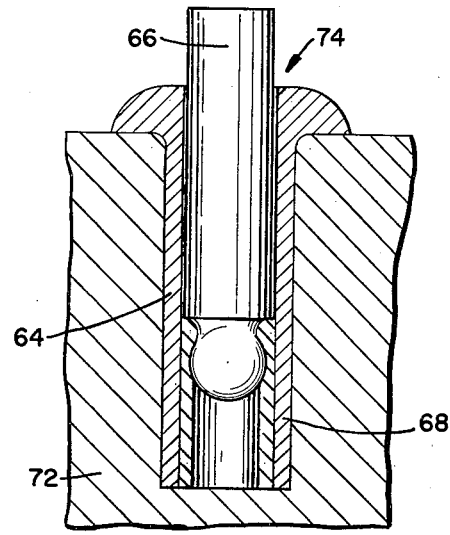

FIGS. 6, 7, 8 and 9 are views similar to FIGS. 1, 2 and 3 and 4, respectively, but showing a second form of rivet embodying the invention.

FIG. 1 shows a rivet 13 embodying the invention at an intermediate stage of its manufacture, rivet 13 comprising a tubular body 16, a ram 18 and an expansion member or dowel 20.

Body 16 defines an axis and has a head 24 at one end and an external cylindrical surface 26 extending from head 24 to the end of body 16 remote from head 24. The shape of head 24 is optional and may be flush instead of raised as shown.

Body 16 further has an axial hole therethrough defined by internal cylindrical surfaces 28 and 30 coaxial with external cylindrical surface 26. Surface 30 is of a predetermined axial length at the end of body 16 remote from head 24, and surface 28 extends through head 24 and toward surface 30. The diameter of surface 30 is less than that of surface 28, and surfaces 28 and 30 are joined by a frusto-conical surface 32.

Dowel 20 is tubular, having an axial hole 34 therethrough, and its axial length is as shown equal to the combined axial lengths of surfaces 30 and 32. The exterior of dowel 20 is cylindrical and is of a diameter slightly less than that of surface 30. Dowel 20 is within body 16, and one end of dowel 20 is flush with the end of body 16 remote from head 24.

Ram 18 is of one-piece solid construction including a cylindrical portion 36 having a striking portion 38 at one end of portion 36. The other end of ram 18 is in the form of a ball 40, with a relief 42 between ball 40 and cylindrical portion 36.

As shown in FIG. 1, ball 40 is within body 16 and faces and engages dowel 20, and cylindrical portion 36 extends outwardly of body 16 through head 24.

The diameter of surface 28 is slightly greater than that of cylindrical portion 36. The diameter of cylindrical portion 36 is greater than the diameter of surface 30, and the diameter of ball 40 is preferably and as shown is slightly less than the diameter of surface 30.

Body 16, ram 18 and dowel 20 may all be of aluminum alloys, but for proper functioning of the rivet, ram 18 should be harder than body 16 and dowel 20. Ram 18 may be of 75ST material, dowel 20 may be of 3S material and body 16 may be of 17ST material.

Rivet 13 is such that ram 18 and dowel 20 could easily fall out of body 16, but for ease of handling it is desirable that these parts be in effect one part. To achieve this desired end, ram 18 is, in a final manufacturing step, forced a predetermined distance further into body 16 than is shown in FIG. 1 while preventing dowel 20 from moving axially with respect to body 16 and also preventing any radial expansion of surface 26. This final step is accomplished with the aid of a block 43 having a cylindrical hole therein conforming in depth and diameter to surface 26. Body 16 is placed in this hole as shown in FIG. 1, with the parts positioned as shown and as described above. Ram 18 is then forced a predetermined distance further into body 16, as by striking surface 38 with a suitable tool such as a hammer (not shown), to the position shown in FIG. 2. This action forces ball 40 to enter hole 34, forces dowel 20 radially outwardly into tight frictional engagement with surface 30 and causes material of dowel 20 to extrude around ball 40 to fill relief 42. Thus it is assured that body 16, ram 18 and dowel 20 will remain together as a unit.

The net result is a rivet 14 (FIGS. 2 and 3) in which dowel 20 frictionally engages body 16 and ball 40 interengages dowel 20.

Rivet 14 is removed from block 43 and is ready for use.

FIG. 3 shows a honeycomb sandwich panel 44 and another structural element 46 which are to be fastened together.

Panel 44 includes a core section 48 of any suitable material, such as aluminum, and relatively thin parallel face sheets 50 and 52 of the same thickness, which may also be of aluminum and which are suitable bonded to core 48. Core 48 is cellular in nature, the cells running perpendicular to sheets 50 and 52, and from one to the other. Honeycomb 44 is such that a relatively small squeezing force applied to face sheets 50 and 52 would either deform or crush honeycomb 44.

Honeycomb 44 and element 46 are provided with holes therethrough which are aligned when these parts are positioned to be fastened together, and the hole through honeycomb 44 is perpendicular to sheets 50 and 52.

Rivet 14 is assembled with element 46 and honeycomb 44 as shown in FIG. 3, with surface 26 of body 16 passing through the aligned holes through honeycomb 44 and element 46, with head 24 engaging the latter. The end of body 16 remote from head 24 extends outside honeycomb 44 beyond face sheet 52.

The assembly of FIG. 3 also includes a collar 54 having a flat end 56 and a recessed end 58. Collar 54 is placed on body 16 until flat end 56 engages face sheet 52. The axial length of cylindrical surface 26 of body 16 and the built-up thickness of honeycomb 44 and element 46 are so related that the recess of collar end 58 is located radially opposite the approximately longitudinal center of dowel 20, whatever the built-up thickness may be, within the tolerance limits thereof. Furthermore, regardless of the position of collar 54 relative to dowel 20, within the limits described above, the essential driving characteristics of rivet 14 will be unchanged.

To effect the desired connection between honeycomb 44 and element 46, an anvil (not shown) may be placed against the end of body 16 remote from head 24, in which case ram 18 is driven a predetermined distance further into body 16, as by striking ram head 38 with a hammer (not shown) to the position shown in FIG. 4, while holding collar 54 snugly against face sheet 52, as shown in FIG. 3. If desired, this procedure can be reversed, in which case the anvil would be held against ram head 38 and the driving force would be applied to the opposite end.

The driving action causes ball 40 to enter dowel 20 further and may cause the end of cylindrical portion 36 of ram 18 remote from ram head 38 to deform frusto-conical surface 32 and also surface 30.

The result is a sure positive connection between honeycomb 44 and element 46 possessing high shear and tensile strength without unsatisfactory deformation of honeycomb 44, regardless of what the built-up material thickness may be within the tolerance limits established therefor.

A second form of the invention is shown in FIGS. 6, 7, 8 and 9, FIGS. 6, 7, 8 and 9 being similar to FIGS. 1, 2, 3 and 4, respectively.

FIG. 6 shows a rivet 62 at an intermediate stage of its manufacture. Rivet 62 is generally similar to rivet 13 and includes a tubular body 64, a ram 66 (which may be identical to ram 18) and an expansion member 68.

Body 64 is similar to body 16, except that the inside of body 64 is as shown in FIG. 6 comprised of a cylindrical surface 70, which is as shown of the same diameter as surface 28, and which extends axially from one end of body 64 to the other. Again there is a slight clearance between ram 66 and surface 70.

Dowel 68 is as shown in FIG. 6 similar to dowel 20 except that the outside diameter of dowel 68 is greater than that of dowel 20, the outside diameter of dowel 68 being slightly less than the diameter of surface 70, and that the diameter of the axial hole through dowel 68 is greater than that of dowel 20.

Again, in order to assure that body 64, ram 66 and dowel 68 remain together as a unit, a final manufacturing step is performed on rivet 62, in which ram 66 is forced a predetermined distance further into body 64, again by the aid of a block 72 (which may be identical to block 43.) This additional step may be the same as that performed on rivet 13 and again the net result is a rivet 74 (FIGS. 7 and 8) in which dowel 68 frictionally engages body 64 and ram 66 interengages dowel 68.

Rivet 74 is removed from block 72 and is ready for use.

Figure 8:
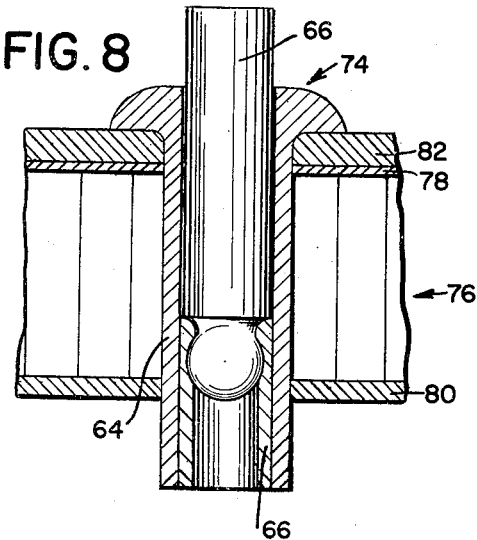
Figure 9:
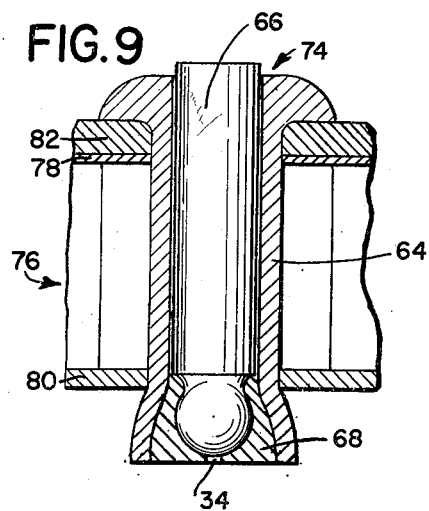

FIG. 8 shows a honeycomb panel 76 similar to honeycomb 44, honeycomb 76 having parallel face sheets 78 and 80. Unlike honeycomb 44, however, face sheet 80 is thicker than face sheet 78, which may be of the same thickness as face sheets 50 and 52. Also shown in FIG. 8 is another structural element 82 which is to be fastened to honeycomb 76 by rivet 74, honeycomb 76 and element 82 having aligned holes therethrough.

Rivet 74 is assembled with element 82 and honeycomb 76 in the same manner in which rivet 14 is assembled with element 46 and honeycomb 44, except that as shown no collar is used with rivet 74.

The length of body 64 is such that with the parts positioned as shown in FIG. 8, the plane of face sheet 80 is located at the approximate longitudinal center of dowel 68.

Thus, with the same built-up material thickness the length of the tubular rivet body should be shorter where no collar is used than where a collar is used.

The driving of rivet 74 is essentially the same as the driving of rivet 14, except that with rivet 74 ram 66 does not directly effect any deformation of body 64.

A connection involving a rivet embodying the invention but without a collar possesses less tensile strength than where a collar is used, and such a connection, without a collar, is particularly suitable where the honeycomb face sheet to which the collar would be applied is fairly thick, so as to be fairly resistant to buckling in and of itself.

It is to be understood that rivet 14 can be used without a collar and that rivet 74 can be used with a collar.

From the above it will be seen that the invention is well suited to attain the enumerated objects and advantages and others not specifically mentioned.

Many details of the disclosed embodiments can be changed without departing from the scope of the invention. These details are therefore not to be taken as limitations upon the invention, except as those details may be specified in the claim.

What is claimed is:

An all-metal rivet comprising a circumferentially continuous one-piece tubular body defining an axis and having first and second ends and an axial bore therethrough from said first end to said second end and including a head portion at said first end and a shank portion between said head portion and said second end, said shank portion having an external cylindrical surface concentric with said axis, a deformable expansion dowel within said bore and located in said shank portion and spaced a predetermined distance toward said second end from said head portion and in frictional engagement with said body, and a rigid ram having a spherical actuating end, a cylindrical portion and a relief space between said spherical end and said cylindrical portion, said spherical end within said bore and positioned between said head portion and the end of said expansion dowel remote from said first end, said spherical end facing away from said head portion and disposed within said expansion dowel and material of said expansion dowel substantially filling said relief space, said cylindrical portion extending outwardly of said body beyond said head portion, said ram in loose fitting relation with said bore, whereby said expansion dowel and said body are radially outwardly expansible by a force applied in a direction to drive said spherical end away from said first end.

(References on following page)

References Cited in the file of this patent

UNITED STATES PATENTS

| | | |
|---|---|---|
| 647,357 | Baker | Apr. 10, 1900 |
| 1,848,142 | Peirce | Mar. 8, 1932 |
| 1,921,794 | Tomkinson | Aug. 8, 1933 |
| 2,054,629 | Huck | Sept. 15, 1936 |
| 2,292,467 | Norsell | Aug. 11, 1942 |
| 2,314,445 | Du Vall | Mar. 23, 1943 |
| 2,424,602 | De Swart | July 29, 1947 |
| 2,482,391 | Webster | Sept. 20, 1949 |
| 2,510,076 | Cockrell | June 6, 1950 |
| 2,542,144 | Kearns | Feb. 20, 1951 |
| 2,555,420 | Richardson | June 5, 1951 |
| 2,609,550 | Phipard | Sept. 9, 1952 |

FOREIGN PATENTS

| | | |
|---|---|---|
| 737,480 | Germany | July 15, 1943 |
| 594,859 | Great Britain | Nov. 20, 1947 |